UNITED STATES PATENT OFFICE.

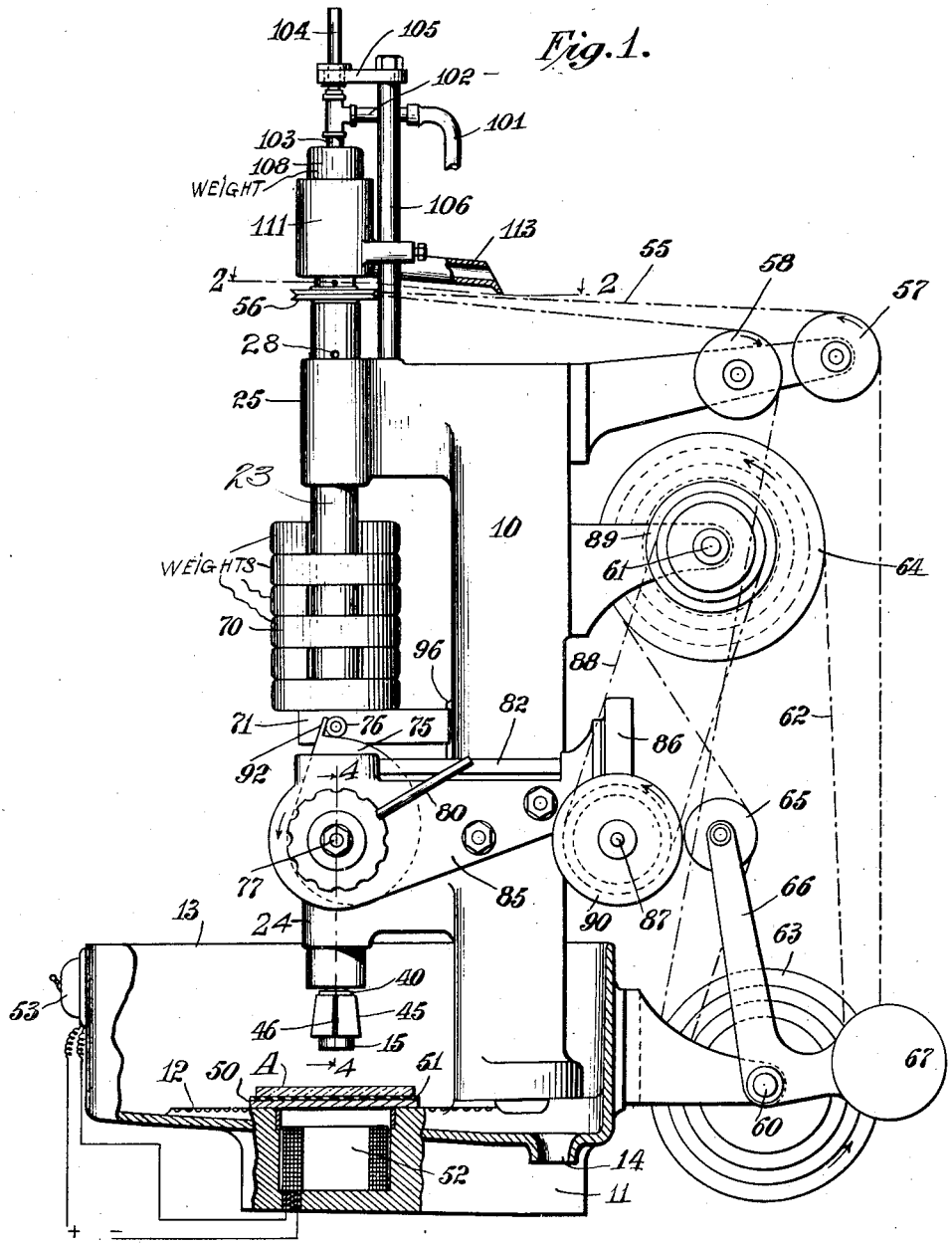

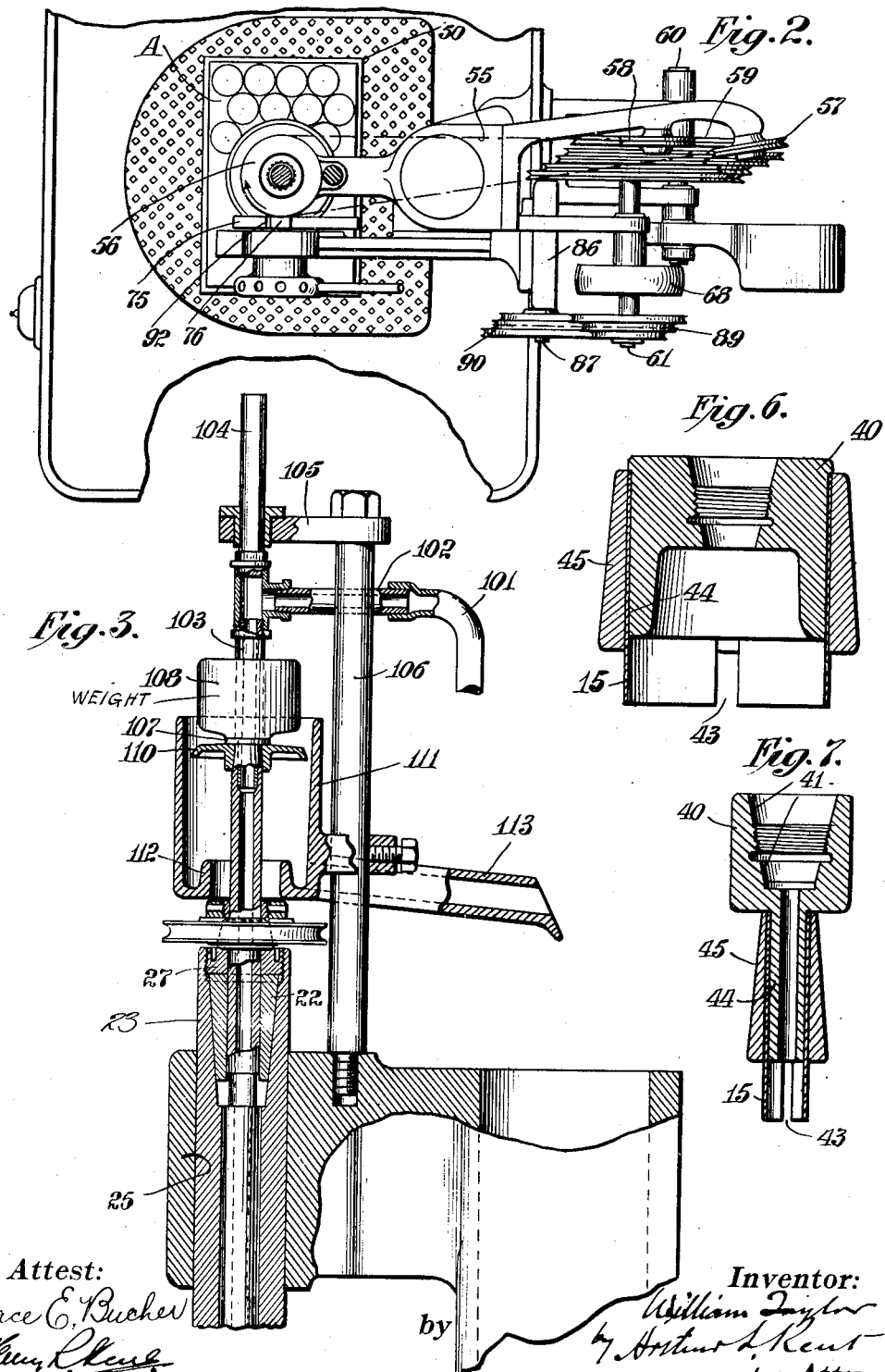

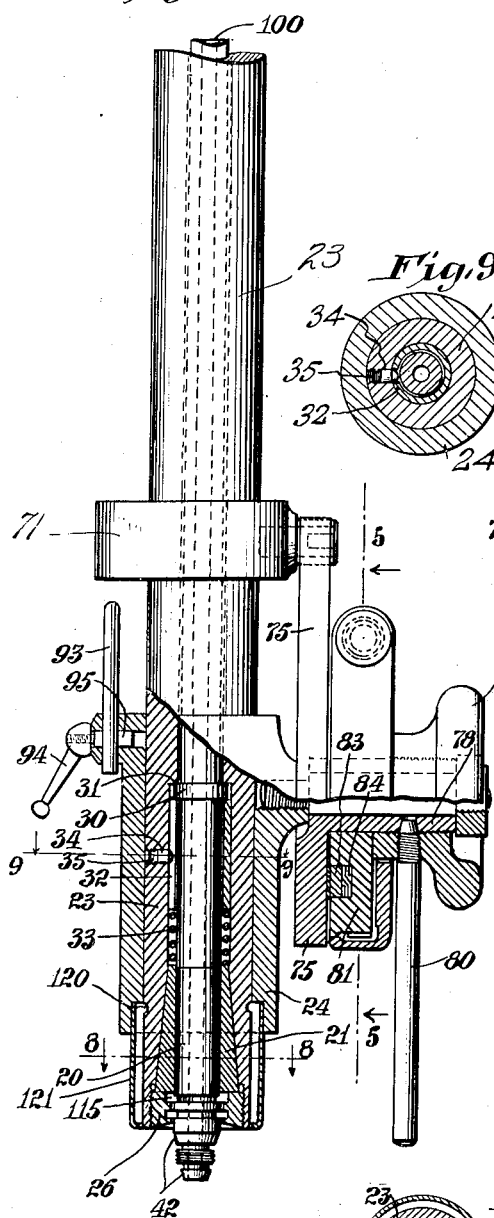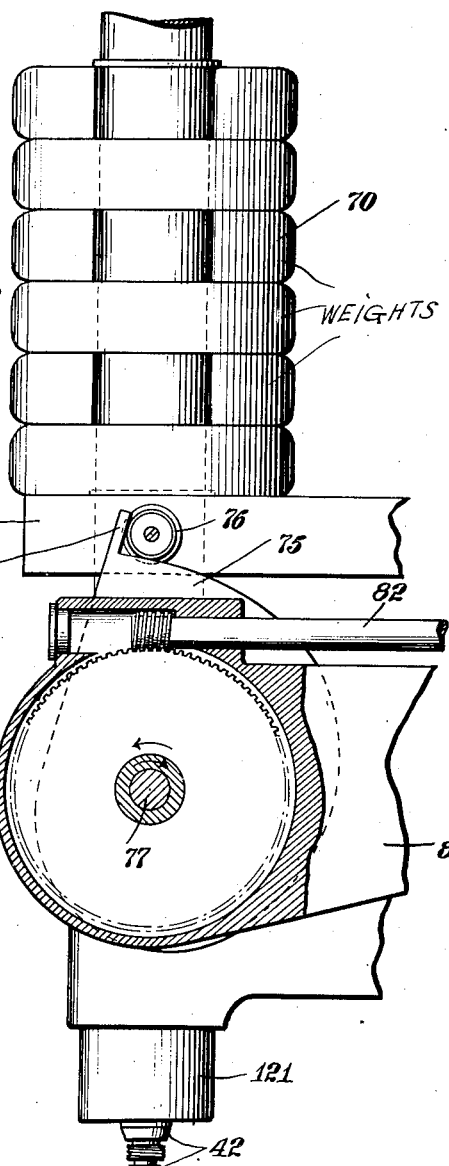

WILLIAM TAYLOR, OF LEICESTER, ENGLAND.

GLASS-CUTTING APPARATUS.

1,385,732.　　　　　Specification of Letters Patent.　　Patented July 26, 1921.

Application filed April 24, 1916. Serial No. 93,271.

*To all whom it may concern:*

Be it known that I, WILLIAM TAYLOR, a citizen of Great Britain, residing at Leicester, in the county of Leicestershire, England, have invented certain new and useful Improvements in Glass-Cutting Apparatus, fully described and represented in the following specification and the accompanying drawings, forming a part of the same.

This invention relates to apparatus for sawing glass, and more particularly to apparatus for cutting disks from sheets of glass and similar material, as in cutting from sheets or plates of optical glass disks for making lenses.

The objects of the invention are generally to control the approaching movement between the work and the saw so as to prolong the working life of the saw while securing a maximum rate of cutting; to provide an improved disk-cutting saw; to provide an improved means for lubricating the saw with a washing and cooling liquid; to provide improved means for holding the sheet of glass or other material from which disks are to be cut; and in general, to provide an improved machine or apparatus which is highly efficient in operation and convenient to manipulate.

Saws for cutting glass and similar material are usually made of sheet metal with their cutting edges charged with an abrasive material, usually diamond particles. In the commercial use of such saws, it is of great importance to secure a maximum output from the saw with a minimum use of diamond. In cutting glass it is customary to employ saws made of a steel or iron plate known in the trade as "lapidary plate," to hack the cutting edge of the plate with a chisel, to place in the resulting cuts diamond dust, generally mixed with oil to form a paste, and then to roll or press the periphery of the cutting edge of the saw so as to close the cuts and thus entrap the diamond dust. I have found that the durability of such a saw depends upon its never being overloaded. If the approaching movement between the saw and the work be too rapid so as to cause overloading of the saw, the metal holding the diamond dust or particles in the cutting edge of the saw becomes overstrained or is quickly worn away by the excess of glass dust formed in too rapid cutting. In either case the diamond particles are released and wasted. On the other hand, it is of course desirable to work the saw at as high a cutting rate as possible without damage, and I have found that such a saw may be worked up to very near the point of overloading without affecting appreciably the durability of the saw. I accordingly provide means whereby the feeding or approaching movement between the saw and the work is positively limited to a rate somewhat below the rate at which overloading with its attendant damage to the saw would take place. But such a rate of feed would in the event of the saw being so worn as to require recharging result in crushing either the saw or the glass, and to avoid this result I provide a non-positive feed for causing the desired approaching movement under a weight or other force sufficient to effect the desired rate of feeding when the saw is in proper condition but not sufficient to cause damage to the saw or the glass when the saw is not in proper condition. The approaching movement between the saw and the work will thus take place under a force sufficient to effect the desired rate of cutting when the saw is in proper condition but not sufficient to damage the saw or glass when the cutting edge is worn, and will be positively limited to the desired maximum rate to prevent overloading.

Such a feeding means is disclosed and claimed broadly in my co-pending application Serial No. 93,270 filed April 24, 1916, in which it is shown as applied to a sawing apparatus having a circular saw for cutting flat plates of glass or other similar material, and in which the work is fed to the saw. In the present application, such feeding means is embodied in an apparatus in which the saw, specifically a saw having an annular cutting edge for cuting disks, is moved toward the stationarily supported material to be cut.

For cutting disks of glass it is customary to use a hollow cylindrical or tubular saw having its annular cutting edge charged with diamond or other abrasive material. In accordance with the present invention, I form such a tubular saw with a narrow slot extending longitudinally of the tube from the cutting edge, and most desirably form the saw from a piece of suitable cheap metal, preferably lapidary plate, bent into the form of a tube with a narrow space or slot between the slightly separated abutting edges of the plate. I find that the longitudinal slot in the tubular saw or cutter prolongs the life of the saw, probably by providing an exit for the glass dust which would otherwise accumulate within the saw, and such a saw may be made cheaply of sheet material of the best kind for the purpose, thus avoiding the necessity of using the more expensive drawn tubes and the necessity of employing only such materials as are commercially available in the form of tubes.

Other features of the invention and their advantages will appear fully from the description of an approved form of apparatus embodying the various features of the invention which will now be given in connection with the accompanying drawings, in which:

Figure 1 is a view of such an approved or typical form of apparatus in side elevation with parts broken away and shown in section;

Fig. 2 is a sectional plan view taken on line 2—2 of Fig. 1;

Fig. 3 is an enlarged sectional view of the upper part of the apparatus looking in the direction in which the apparatus is viewed in Fig. 1;

Fig. 4 is an enlarged elevation partly in section taken on line 4—4 of Fig. 1 showing the lower portion of the saw-carrying spindle and associated parts;

Fig. 5 is a view on the scale of Figs. 3 and 4 taken on line 5—5 of Fig. 4;

Figs. 6 and 7 are sectional views showing respectively a large and a small cutter or saw and the chucks for carrying same;

Fig. 8 is a sectional view taken on line 8—8 of Fig. 4; and

Fig. 9 is a setional view taken on line 9—9 of Fig. 4.

Referring to the drawings, the moving parts of the apparatus are shown as carried by a column 10 which extends upward from a table piece 11 which may be formed to stand on a bench or may be mounted on a suitable column or legs to stand on the floor. The base 11 is formed to provide a flat topped table 12 for supporting the plate or slab of glass to be cut and is extended beyond the table and provided with upturned edges 13 to provide a pan for catching the water or other lubricating liquid. The pan is provided with a suitable drain outlet as shown at 14. The surface of the table 12 is most desirably formed with a series of intersecting grooves as shown by Figs. 1 and 2, leaving a checkered supporting surface from which the water and glass dust may readily escape.

The tubular cutter 15 is carried and rotated by a spindle 20 which is mounted to rotate in adjustable bearings 21 and 22 in a hollow shaft or quill 23 placed vertically and supported to have vertical sliding movement in upper and lower bearings 24 and 25 carried by offsets from the column 10.

It has been found necessary to provide a construction of the spindle and its mountings to meet the trying conditions of high speed, imperfect balance of the cutter or saw, and the presence of water and glass dust, while securing to the utmost degree the necessary freedom from vibration of the spindle laterally or endwise. The spindle bearings 21 and 22 are made in the form of sleeves tapered on the outside to fit tapered or coned seats formed in the ends of the quill and are slit longitudinally as appears from Fig. 8, which shows the bearing 21 in cross section. The bearing 21 is forced into its seat in the lower end of the quill by a threaded collar 26 which screws into a threaded socket formed in the end of the quill, and similarly the upper bearing 22 is forced into its seat in the upper end of the quill by a threaded collar 27. By these means the bearings are centered in the quill and may readily be adjusted and maintained in adjustment.

To prevent vibration of the spindle at any point between its bearings 21 and 22, the bore of the quill is made of such size as to fit rather closely on the spindle, leaving a cylindrical space of only a few thousandths of an inch radial thickness in which oil is held by capillary action and serves to damp out vibration of the spindle which would otherwise contribute to the breaking down of the bearings 21 and 22 as well as to interfere with accuracy of cutting. Oil is supplied to this space and also to the bearing surfaces through an oil hole 28 near the top of the quill 23, which hole, for protection against the entrance of dirt, is located so as to lie normally within the bearing sleeve 25 and to be exposed only when the quill is at its uppermost position.

In order to avoid end shake of the spindle, it is provided with a collar 30 (see Fig. 4) which bears against a shoulder 31 formed in the bore of the quill, the collar, which is fast on the spindle, being thrust against the shoulder 31 by a sleeve 32 and a compression spring 33 of rather more than sufficient strength to lift the spindle and parts carried thereby. The sleeve 32 is split longitudinally, and a wedge 34 acted on by a screw 35 set in a tapped hole in the quill serves to expand the sleeve so that after it has been allowed to be lifted by the spring 33 to force the collar 30 under the desired pressure against the shoulder 31 the sleeve may be clamped rigidly within the bore of the quill, thereby preventing all endwise motion of the spindle.

The annular saw or cutter 15 is carried by a chuck 40 (see Figs. 1, 6 and 7) which is detachably secured to the lower end of the spindle, the chuck being internally threaded to screw on to an external thread on the spindle and being centered by means of cone surfaces 41 co-acting with correspondingly coned surfaces 42 on the end of the spindle.

The cutter is in the form of a metal tube or hollow cylinder made most desirably of a piece of lapidary plate bent into the form of a tube with its abutting edges slightly spaced to provide an open slot 43, the opposite edges of which are best approximately parallel as shown in Figs. 6 and 7. The plate used is usually about .02 inches thick, and the inner diameter of the tube should be approximately that of the diameter of the disk to be cut. The cutter is removably secured to the chuck by being fitted on to a cylindrical portion or seat 44 which determines the inner diameter of the cutter tube and it is clamped on such cylindrical portion or seat by a collar or sleeve 45 bored cylindrically to fit tightly outside the cutter tube and slit longitudinally, as shown in Fig. 1, to permit of its being opened slightly so that it may be forced into position. For so opening or slightly extending the collar 45, the slit of the collar may be formed with an elongated enlargement as indicated at 46 in Fig. 1, into which the end of a suitably shaped tool may be placed and turned so as to expand or slightly open out the collar. The collar is made of sufficient thickness and strength to hold the cutter tube tightly on the cylindrical portion 44 of the chuck, and is best tapered on the outside with its thicker portion at the bottom in order both to secure maximum pressure toward the active end of the cutter and to insure that water or other lubricating liquid which may get on the sleeve shall be discharged from the lower end thereof and not higher up where it might be objectionable. At the upper end of the cylindrical portion 44, the chuck is formed with a shoulder or abutment against which the upper end of the cutter tube is thrust. The form of the chuck will be varied somewhat according to the relative size of the cutter tube carried by it, as for example, as shown by Figs. 6 and 7 respectively.

The angular cutting edge of the saw or cutter, that is, the lower edge of the cutter tube, is charged with diamond dust or other suitable abrasive material, as by being notched with a chisel and having the diamond dust mixed with oil to form a paste, placed in the resulting cuts and then being rolled or pressed to close the cuts and entrap the diamond dust.

In order that a number of disks may be conveniently cut from a sheet or plate of glass and that the same may be conveniently held in position on the table 12, I cement the glass plates A to metal plates 50, most desirably iron, for the purpose hereinafter explained, and of which a number are provided for each machine all made of uniform thickness; and in order to prevent damage to the cutter by overrunning and to permit the cutter to pass completely through the glass without being damaged by contact with the plate beneath, I place between the supporting plate or holder and the glass plate carried thereby a sheet of thick paper 51 or other material not injurious to the cutter. Such a sheet of paper dipped in melted pitch or wax and placed between the glass and the holding plate, the glass and plate being previously heated, serves both to cement the glass to the plate and to prevent damage to the cutter as above stated.

For conveniently holding the glass and its supporting plate 50 in position on the table 12 and to permit the position of the glass plate to be conveniently changed as desired, I make the holding plate 50 of iron and provide an electromagnet 52 set in a recess in the center of the table 12, so that the plate 50 and the glass plate carried thereby will be held in position on the table 12 when the magnet is energized, in a manner well known in connection with magnetic chucks. By simply closing or opening the circuit to the magnet, therefore, the glass and its supporting plate 50 may be secured to or released from the table as desired. The magnet circuit, as indicated in Fig. 1, may be controlled by means of a switch 53, conveniently placed, or in place of the switch or in combination therewith I provide a circuit controlling means whereby the circuit to the magnet will be automatically opened and closed as the cutter is raised from or moved down toward the table as hereinafter described.

The spindle 20 is driven by means of a belt 55 running on a pulley 56 fast on the spindle above the bearing 22, the belt passing over guide pulleys 57 and 58 to a pulley 59 on a countershaft 60. To provide for variation in speed of the spindle to suit cutters of different diameters, the countershaft 60 is driven from a shaft 61 by a belt 62 running on stepped pulleys 63 and 64 on the shafts 60 and 61 respectively. This belt 62 is tensioned by means of a jockey pulley 65 carried by one arm of a bell crank lever 66, the other arm of which is provided with a weight 67 sufficient to hold the belt under the desired tension. The belt may thus be of sufficient size to permit of its being adjusted on the stepped pulleys to give the desired speed of the spindle. The shaft 61 carries a driving pulley 68 through which the shaft may be driven by a belt from any suitable source of power.

The spindle is moved longitudinally to move the cutter toward and from the work table 12 by endwise movement of the quill 23 in its bearings 24 and 25. In the construction shown, the quill and spindle move downward under the action of gravity, the rate of such downward movement being limited by positively acting means to prevent too rapid feed of the cutter into the work. The apparatus should most desirably be constructed so that the weight of the spindle, quill and parts carried thereby will be sufficient to cause the cutter to be fed into the work at the desired rate, but not sufficient to result in the saw or the glass being crushed when the saw becomes worn so that it will not cut at the desired rate. With the weight of the spindle and quill and attached parts suitable for feeding a small cutter at a sufficient rate additional force may be required in using larger cutters, and for adjusting the feed force for different cutters I therefore provide removable weights 70 formed with radial slots and adapted to be placed on the quill resting on a collar 71 which is secured fast to the quill between its bearings.

For limiting the feed of the cutter to a rate which is maximum for a properly charged cutter but not so great as to overstrain the cutter and dislodge the diamond, the quill is provided with a check in the form of a cam roll 76, below which is a spiral cam 75 turned toward the left from the position in which it is shown in Fig. 1, and at a rate determined by the rate of movement of the cam. The cam is rotatably mounted on a stud 77 extending from the arm or offset of the column 10 which carries the quill bearing 24, and is turned to permit downward movement of the quill at the required rate by the following means:—The cam has a hub or sleeve 78 which extends outward on the fixed stud 77, being held thereon by a nut as shown in Fig. 4. A hand wheel 79 is screwed on to the sleeve or hub 78 and pinned thereto by the end of a hand lever 80 which screws into a tapped opening in the hub of the hand wheel and projects into an opening in the sleeve 78. Mounted to turn on the sleeve 78 between the hub of the hand wheel 79 and the face of the cam 75, is a worm wheel 81 which is driven slowly by a worm on a worm shaft 82. The worm wheel carries in one or more pockets in its side facing the cam one or more friction pads 83 which are thrust against the face of the cam by springs 84, so that when the worm wheel is turned it will drive the cam frictionally or tend to drive it.

The worm wheel 81 is contained in a casing or box 85 which is secured to the column 10 and which carries bearings for the worm shaft 82, and the casing 85 also carries at the rear of the column 10, or is extended to form, a casing 86 for a second worm wheel mounted on the end of the worm shaft 82. This second worm wheel engages and is driven by a worm on a shaft 87 which receives its movement from the driving shaft 61 through a belt 88 running on stepped pulleys 89 and 90 on the shafts 61 and 87 respectively. By shifting the belt 88, the speed of the turning movement of the cam may thus be varied to vary the rate of feed of the cutter. The rate at which the cutter should be advanced depends on the speed of rotation of the cutter, its diameter and the hardness of the glass being cut. Ordinarily, with the spindle rotating at a speed in the neighborhood of 2800 R. P. M. and with a cutter of say one inch in diameter, the cutter is advanced to penetrate the glass at the rate of about one inch in five minutes.

The friction drive between the worm wheel 81 and the cam 75 permits of the cam being turned manually by turning either the hand wheel 79 or the lever 80 to raise the cutter or to lower it into position for starting a cutting operation as desired. In order to prevent the cam being turned so far that the cam roll 76 will drop over the peak of the cam, a stop is provided which is conveniently a projection 92 extending from the cam in position to engage the roller and prevent further rotation of the cam when the quill has been raised to the highest point. A stop is also provided for limiting the extent of the downward movement of the quill and is made adjustable so that it may be set according to the particular cutter being used. For this purpose there is provided, as shown, an adjustable stop rod 93 which extends upward from the bearing sleeve 24 and may be clamped in the desired position by a lever 94 operating an eye-bolt 95. The upper end of this stop rod engages the collar 71 when the quill reaches the end of its downward movement, and the rod is set so that the collar will come into engagement therewith and prevent further downward movement of the quill just after the cutter has penetrated the plate of glass being cut and before it comes into engagement with the holding plate 50.

To prevent turning movement of the quill, the collar 71 is provided with an extension formed to have sliding engagement with a rib 96 on the column 10.

In order to lubricate the cutter, keep it cool and wash out the glass dust which it forms in cutting, a lubricating liquid is supplied to the interior of the cutter or saw cylinder. For this purpose the spindle 20 is formed with a longitudinal passage or bore 100 through which the lubricating liquid, which is best a water solution of soap with free soda to prevent rusting, is fed under suitable pressure to the interior of the cutter. The liquid may be supplied from a pump and system of piping which supplies a number of machines in common, and it enters the bore of the spindle through a connecting hose 101, connecting pipe 102 and vertical pipe 103 the lower end of which enters freely into an enlargement of the bore of the spindle at the upper end thereof. The pipe 103 is guided by an upward extension thereof or guide rod 104 which slides in a guide opening in an arm 105 carried by a rod or pillar 106 extending upward from the upper bearing arm of the column 10. The pillar 106 also serves by engagement with the short pipe 102 to hold pipes 102 and 103 against rotation with the spindle.

The pressure of the liquid within the cutter resulting from the length of the column of liquid in the spindle may be sufficient, or the pressure may be increased more or less by the pressure under which the liquid is supplied through the pipe 103. But to substantially prevent escape of the liquid from the upper end of the spindle in any case, a leather or other suitable washer 107 is placed between the end of the spindle and a shoulder of the pipe 103 as shown in Fig. 3, and the pipe carries a weight 108 to give sufficient pressure on the washer to substantially prevent the escape of the liquid at this point.

In order to catch any liquid which may at times escape past the washer 107, an umbrella-shaped flange 110 is fixed at the top of the spindle and discharges any escaping liquid by centrifugal action against the inner wall of a cylindrical cup or basin 111, carried by the pillar 106, which is open at the top and has its bottom formed with a central opening and provided with an upturned flange 112 surrounding the pipe and forming an annular gutter through which the liquid escapes through a discharge pipe 113. The supporting column 10 is made hollow and open at the top, and any liquid discharged from the cup 111 through the outlet pipe 113 is delivered into the open upper end of the column through which it passes and drains out into the pan 13.

In order to prevent water or other lubricating liquid which may splash up about the lower end of the spindle, and grit carried thereby, from reaching the lower bearing 21, the screw collar 26 is made to fit closely about the end of the spindle and is formed with one or more internal circumferential grooves 115 and the end of the spindle is formed with corresponding circumferential grooves to register with the grooves 115, so that any water and grit which may creep up between the sleeve and the spindle by capillary action will be discharged by centrifugal action into the groove chambers where the capillary action is interrupted.

In order to keep liquid and grit from reaching the bearing surfaces between the quill and its bearing 24, the lower end of the quill is made of somewhat less diameter than the part which engages the bearing 24 and is separated from such bearing portion by means of a circumferential groove 120, and a tubular cover or casing 121 is provided projecting downward from the bearing 24 to protect the projecting end of the quill. The casing 121 is removably fixed in a counterbore in the end of the bearing and is of such internal diameter as to leave an annular space between it and the end of the quill which is too large to hold water by capillary attraction. Thus no part of the lower end of the quill which enters the bearing 24 will be exposed at any time to access of the lubricating liquid, grit or dirt.

The operation of the machine will be understood from the foregoing description, but is briefly as follows: A sheet of glass, from which disks are to be cut, having been cemented to one of the supporting plates 50, as hereinabove described, and the supporting plate with the glass having been placed in the desired position on the table 12 and being held in position by the magnet, the circuit to which has been closed, and a chuck carrying a cutter of the desired size having been attached to the lower end of the spindle, the spindle will be lowered by turning the cam 75 by means of the handle 79 or lever 80 until the cutter is brought into or approximately into contact with the glass, whereupon, the driving shaft 61 being in operation to cause rotation of the spindle and slow turning movement of the cam 75, the cutting will proceed, the cutter moving gradually downward under the weight of the spindle and quill and whatever of the weights 70 are in position, but its downward movement being limited by the cam 75. The stop-rod 93 having been properly adjusted, the downward movement of the cutter will be interrupted when it has passed completely through the glass but before its cutting edge comes into engagement with the plate 50. Then by turning the cam 75 backward manually, the quill, spindle and cutter may be raised from the down position shown in Fig. 4 to the up position shown in Figs. 1, 3 and 5, and on opening the magnet circuit the supporting plate 50 and glass plate A may be quickly shifted to bring a new portion of the glass into position beneath the cutter, and the cutting operation will then be repeated as before. During the cutting operation lubricating liquid will be supplied through the hollow spindle to the interior of the tubular cutter, and escaping freely through the slot in the cutter will carry away the glass dust and grit, thereby, as I find, substantially reducing the wear of the cutter and increasing its life.

What is claimed is:

1. Apparatus for cutting disks from glass or other hard substances, comprising in combination a rotary cylindrical cutting member having an annular cutting edge, a holder for supporting the material to be cut, means for applying to one of the said members a predetermined force to drive said cutting edge through the material, and a retarding device operating to prevent the movement of the cutting edge through the material from exceeding a predetermined rate.

2. Apparatus for cutting disks from glass or the like, comprising a rotary cylindrical cutting tool having an annular cutting edge charged with abrasive material fixed therein, and means for effecting a relative feeding movement between the tool and the work including means for mechanically limiting the maximum pressure between the cutter and the work and the maximum rate of feed to predetermined values.

3. Apparatus for cutting disks, comprising in combination a cylindrical cutter having an annular cutting edge charged with abrasive material fixed therein and means for constantly rotating said cutter, a support for the glass to be cut, means for applying to one of said members a predetermined force tending to cause said cutter to move through said glass, a check upon the member to which said force is applied, and positively driven means limiting by contact with said check the movement of the cutter through the glass to a predetermined rate greater than the rate at which said force would drive said cutter through the glass when the saw is dull and less than the rate at which said force would drive said cutter through the glass when the saw is sharp, whereby the rate of movement of the cutter through the glass is determined by the said positive means in contact with said stop when the saw is sharp and is determined by said predetermined force without contact between said limiting means and said check when the saw is dull.

4. Apparatus for sawing, comprising in combination means for supporting the glass to be cut, a rotatable saw, means for rotating the same, means for applying a predetermined force to said saw tending to cause it to move through the glass, a check upon said means, and a positively driven cam which by contact with said check limits the movement of the saw through the glass to a predetermined rate greater than the rate at which said force would drive the saw through the glass when the saw is dull and less than the rate at which said force would drive the saw through the glass when the saw is sharp, so that when the saw is sharp said check is in contact with said cam and the rate of movement of the saw through the glass is determined by the movement of the cam, while when the saw is dull, said check is not in contact with said cam and the rate of movement of the saw through the glass is determined by said constant force.

5. Apparatus for sawing, comprising in combination means for supporting the glass to be cut, a saw, a holder for supporting and driving said saw, a weight upon said holder tending to force said saw through the glass under a constant predetermined force, a check upon said holder, and a cam which by contact with said check limits the movement of the saw through the glass to a predetermined rate, whereby said check is maintained in contact with said cam when the cutting surface of the saw is such that said weight forces said saw through the glass at a rate greater than that limited by the movement of said cam, and said check is not in contact with said cam when the cutting edge of the saw is such that said weight forces of the saw is such that said weight forces the saw through the glass at a rate less than that limited by the movement of the cam.

6. Apparatus for cutting disks, which comprises in combination a cylindrical cutter having an annular cutting edge charged with abrasive material fixed therein, means for supporting the glass to be cut, one of said members tending to move to cause a relative approaching movement between the glass and the cutter, means for limiting such approaching movement to a predetermined rate, and lubricating means for feeding lubricating liquid to the interior of the cutter.

7. Apparatus for sawing, comprising in combination a support for the glass to be cut, a tubular saw, means for constantly rotating said saw, means for applying predetermined force to said saw tending to force it through the glass, and positively driven means to limit the rate of movement of the saw through the glass.

8. Apparatus for sawing, comprising in combination means for supporting the glass to be cut, a saw having an annular cutting edge charged with abrasive material fixed therein, means for rotating said saw, a holder for supporting the saw, means for applying a predetermined force to said saw tending to force it through the glass, and means for limiting the movement of said saw through the glass to a predetermined rate to prevent overloading of the saw, and the resulting release of abrasive material therefrom.

9. Apparatus for cutting disks, comprising in combination means for supporting the glass to be cut, a saw having an annular cutting edge charged with abrasive material fixed therein, means for rotating said saw, a holder for supporting said saw, means for applying to said holder a predetermined force tending to drive the saw through the glass, said force being sufficient to cause cutting at a safe speed when the saw is dull and to cause cutting at a rate sufficiently rapid to injure the saw when the saw is sharp, a check upon said holder, and a cam limiting the movement of the saw to a predetermined rate by contacting with said check when the surface of the saw is such that said force tends to drive the saw through the glass at a rate sufficient to injure the saw.

10. Disk cutting apparatus, comprising in combination a support for the material to be cut, a spindle, a cutter carried on one end thereof, yielding means for producing a longitudinal movement of the spindle whereby the cutter is forced through the material to be cut, and positive means receding at a constant rate of speed for limiting the movement of the spindle during the passage of the cutter through the material to be cut.

11. Apparatus for cutting disks from glass or other hard substances, comprising in combination a cylindrical cutting member having an annular cutting edge, a holder for supporting the material to be cut, means for applying to one of said members a predetermined force tending to drive said cutting member through said material, a retarding device operating to positively prevent the movement of the cutting member through the material from exceeding a predetermined rate, means for driving said retarding device at a constant rate of speed during the passage of the cutting member through the material, and means for varying the speed of operation of said retarding device.

12. Apparatus for cutting disks from glass or similar material, which comprises in combination a slotted cylindrical cutter having an annular cutting edge, means for rotating the cutter, means for continuously feeding said cutting edge into the material to be cut, particles of abrasive material fixed in said cutting edge, each particle extending partway across said edge, the slot in the cutter extending transversely from said cutting edge, whereby the detritus produced by the cutting passes between the particles of abrasive material and through the slot.

13. Disk cutting apparatus, comprising a rotary spindle carrying a tubular saw at one end thereof, a longitudinally movable member, bearings for the spindle carried by the member, said member, bearings and spindle being adapted to move together longitudinally under the action of a predetermined force to feed the saw through the material to be cut, and means coöperating with said longitudinally movable member for limiting such feeding movement to a predetermined rate.

14. Apparatus for sawing, comprising a rotary spindle, a longitudinally slotted saw carried by the spindle, said spindle having a passage communicating with the interior of said saw and being adapted to move longitudinally to force the saw through the material being cut with a force sufficient to effect such feeding movement at the desired rate when the saw is in proper working condition, but insufficient to damage the saw or material when the saw is blunt, and means movable longitudinally with the spindle for supplying liquid to the passage in the spindle.

15. Disk cutting apparatus, comprising a rotary spindle, a saw holder on the end of the spindle having a cylindrical saw supporting surface, a saw formed from a piece of sheet metal bent into tubular form and placed on said surface, and a split collar for holding the saw tightly on said surface, said collar being exteriorly tapered outwardly toward its outer end.

16. Disk cutting apparatus, comprising a hollow rotary and longitudinally movable spindle, a tubular saw carried by one end of the spindle, a non-rotating liquid supply pipe having a free connection with the other end of the spindle and longitudinally movable therewith, a sealing washer between the non-rotating pipe and spindle, and means for forcing the pipe toward the rotating spindle to compress and provide a substantial liquid seal at the washer.

17. Disk cutting apparatus, comprising a hollow rotary and longitudinally movable spindle, a tubular saw carried by the lower end of the spindle, a liquid supply pipe having a free connection with the upper end of the spindle and movable longitudinally therewith, means for hindering the escape of the liquid from between the pipe and the spindle, a liquid discharging flange carried by the upper end of the spindle, and a liquid catching cup supported independently of the spindle and extending about the same and about said flange and having an upwardly extending interior flange providing an annular gutter for receiving the liquid and a discharge passage leading from such gutter.

18. Disk cutting apparatus, comprising a rotary spindle, a tubular saw carried by the lower end of the spindle, means for supplying liquid to the interior of the saw, a longitudinally movable quill in which the spindle is mounted to rotate, a cylindrical bearing for the quill adjacent the lower end of the spindle, the extreme lower end of the quill being of slightly reduced external diameter as compared to the part which engages the bearing, and a casing which extends downward from the quill bearing to protect the end of the quill from access of liquid and dirt.

19. Disk cutting apparatus, comprising a rotary spindle, a longitudinally movable quill in which the spindle is mounted, a tubular saw carried by the lower end of the spindle, the quill and spindle being adapted to move downward under the action of gravity to feed the saw through the material being cut, means for limiting such feeding movement to a predetermined rate, and removable weights adapted to be applied to the quill for varying the force under which the feeding movement of the saw takes place.

20. Disk cutting apparatus, comprising a rotary spindle, a saw charged with abrasive material fixed therein and carried by said spindle, and a quill carrying bearings for the spindle, said quill bearings and spindle being adapted to move downwardly under the action of gravity to force the saw through the material being cut with a force of predetermined amount slightly below that which would overload the saw and release the abrasive material therefrom.

21. Disk cutting apparatus, comprising a vertical rotary spindle carrying a tubular saw at one end thereof, a vertical longitudinally movable member, bearings for the spindle carried by the member, said member, bearings and spindle being adapted to move together longitudinally downward under the action of gravity to feed the saw through the material being cut, and positive means for limiting such feeding movement to a predetermined rate.

22. Cutting apparatus, comprising in combination a holder for supporting the material to be cut having such material secured to its face with a sheet of relatively soft material between the material to be cut and the face of the holder, a cutter, means for supporting and driving the cutter, means adapted to cause a relative approaching feeding movement between the cutter and the holder, and means for interrupting automatically the feeding movement when the cutter has cut through the first-named material and is operating upon the soft material.

23. Cutting apparatus, comprising in combination a holder for supporting the material to be cut and having such material secured to its face with a sheet of relatively soft material between the material to be cut and the face of the holder, a cutter, means for supporting and driving the cutter, means adapted to cause a relative approaching feeding movement between the cutter and the holder, and adjustable means for interrupting automatically the feeding movement when the cutter has cut through the first-named material and is operating upon the soft material.

24. Apparatus for sawing disks, which comprises in combination a cylindrical cutter having an interrupted annular cutting edge charged with abrasive material fixed therein, means for supporting the material to be cut, one of said members tending to move to cause a continuous relative approaching movement between the material and the cutter so that the annular edge of the cutter is forced into the material, and lubricating means for feeding lubricating liquid into the interior of the cutter.

25. Apparatus for sawing, comprising a rotary spindle, a quill having bearings in which the spindle is mounted, a saw carried by the spindle, the quill and spindle being adapted to move downward to feed the saw through the material being cut, and means coacting with said spindle and quill for damping the vibrations of said spindle.

26. Disk cutting apparatus, comprising a rotary spindle, bearings for said spindle and means for damping vibrations of the spindle, said means consisting of a jacket surrounding the spindle and spaced therefrom to provide an annular capillary space between the jacket and the spindle, and a liquid in said space.

27. Disk cutting apparatus, comprising a vertical rotary spindle having two spaced bearing surfaces, a support for said spindle having spaced bearings coacting with the bearing surfaces of said spindle, means for damping the vibrations of said spindle consisting of a jacket extending between said bearings surrounding said spindle and spaced therefrom at the distance of a few one-hundredths of an inch, and a liquid filling the space between the spindle and the tube.

28. Apparatus for sawing, comprising a rotary spindle, a quill in which the spindle is mounted, a longitudinally slotted tubular saw carried by the spindle, said spindle having a passage communicating with the interior of said saw, the quill and spindle being adapted to move downward to force the saw through the material being cut with a force sufficient to effect such feeding movement at the desired rate when the saw is in proper working condition but insufficient to damage the saw or material when the saw is blunt, and means movable longitudinally with the spindle for supplying liquid to the passage in the spindle.

29. Apparatus for cutting disks from glass or other hard substances, comprising in combination a cylindrical cutting member having an annular cutting edge, a holder for supporting the material to be cut, means for applying to one of said members a predetermined force tending to drive said cutting member through said material, a retarding device operating to positively prevent the movement of the cutting member through the material from exceeding a predetermined rate, power operated means for driving said retarding device while the cutter is passing through the material, a yielding connection between said power operated means and said retarding device, and means for manually adjusting said retarding device.

In testimony whereof I have hereunto set my hand in the presence of two subscribing witnesses.

WILLIAM TAYLOR.

Witnesses:
A. PIERCE,
P. CHAWNER.